United States Patent

[11] 3,628,294

[72] Inventors Gunter Sattler
Mannheim-Kafertal (D);
Klaus Weimann, Lampertheim, both of Germany

[21] Appl. No. 823,592
[22] Filed May 12, 1969
[45] Patented Dec. 21, 1971
[73] Assignee Aktiengesellschaft Brown, Boveri & Cie
Baden, Switzerland
[32] Priority May 17, 1968
[33] Germany
[31] P 17 64 326.4

[54] PROCESS FOR MAKING A BEVELLED CAVITY IN A SEMICONDUCTOR ELEMENT
3 Claims, 3 Drawing Figs.

[52] U.S. Cl. .......... 51/283, 51/326, 125/2, 125/21, 317/235 AJ
[51] Int. Cl. .......... B24b 1/00
[50] Field of Search .......... 51/283, 281, 326, 327, 105, 62, 154; 317/235–247; 125/2, 21

[56] References Cited

UNITED STATES PATENTS

| | | | |
|---|---|---|---|
| 1,945,935 | 2/1934 | Fischer | 51/62 X |
| 2,876,599 | 3/1959 | George | 51/105 |
| 3,299,579 | 1/1967 | Jacobson | 51/327 X |
| 3,307,240 | 3/1967 | Ginsbach et al. | 29/25.3 |
| 3,437,886 | 4/1969 | Edgvist et al. | 317/234 |

*Primary Examiner*—Lester M. Swingle
*Attorney*—Pierce, Scheffler & Parker

ABSTRACT: A bevelled cavity in the periphery of a disc of semiconductor material having at least two parallel spaced PN-junctions reaching to the edge of the disc is formed by grinding out the cavity, the grinding being carried out by using separate grinding wires which are of progressively smaller diameter.

Figure 1:
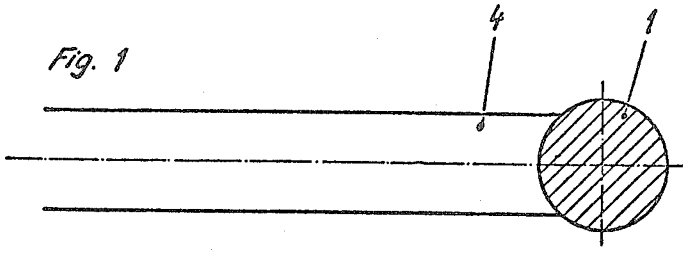

Inventors
Günter Sattler
Klaus Weimann
By Pierce, Scheffler & Parker
Attorneys

PROCESS FOR MAKING A BEVELLED CAVITY IN A SEMICONDUCTOR ELEMENT

This invention relates to a process for making an internally bevelled cavity on the noncontacting surface of a semiconductor structural element.

It has been found to be necessary to reduce, by suitable measures the surface field strength on that surface of a semiconductor member on which the PN-junction surface emerges. An additional electrostatic charge which reduces the inverse voltage in the cutoff direction is normally present there. The critical electric field strength is reached sooner on the surface, as a result of the additional electrostatic charge, than inside the semiconductor member, with the consequence that voltage breakdowns occur on the surface. Such high electric field strengths can occur when a voltage is applied to the semiconductor element, that is to say in static operation. However, voltage breakdowns make the characteristic curve unstable, and finally lead to irreparable damage to the semiconductor member.

An arrangement for reducing the surface field strength for the reasons described was specified for the first time in German specification No. 1,212,215 open to public inspection. The lateral surface of the semiconductor member on which the PN-junction surface emerges is so bevelled that the lateral surface is at an angle of approximately 175° to the second and more weakly doped zone of the PN-junction over the whole periphery of the semiconductor member. This moves the electric field lines apart on the surface and thus reduces the effect of the additional surface charge.

However, this so-called positive angle, i.e. the transition from more highly to more slightly doped material with a decreasing cross-sectional area, is optimal only for the PN-junction disposed on the anode side in the case of controlled silicon rectifiers, for example, thyristors. This PN-junction determines the inverse voltage in the cutoff direction. There is then a so-called negative angle for the second PN-junction counting from the anode side which decides the inverse voltage in the conductive direction, i.e. a transition from more slightly to more highly doped material with a decreasing cross-sectional area, but for this transition the surface field strength rises in the case of polarization in the conductive direction. Accordingly, in spite of symmetrical doping of the two P-zones the value of inverse voltage in the conductive direction is lower than the value of inverse voltage in the cutoff direction.

In their article: "Control of Electric Field at the Surface of PN-Junctions," IEEE Transactions on Electron Devices, July 1964, p. 313 et seq., R. L. Davies and F. E. Gentry have shown that the surface field strength in the vicinity of the last-named PN-junction with a negative angle decreases again towards very shallow angles. Angles of between 175° and 180° are stated to be optimal.

Accordingly, semiconductor members now on the market are normally ground to a double angle. However, the shallower angle disposed on the cathode side considerably reduces the emitter surface required for contact purposes which in turn determines the maximum emitter-current loading.

Davies' and Gentry's considerations lead to the conclusion that the said two emerging PN-junction surfaces ought to be at a positive angle, which can be attained only with a bevelled cavity. Such an embodiment has already been proposed in German Specification No. 1,250,008, open to public inspection, but without any due consideration of the physical background. According to this specification open to public inspection, the various profiles represented are etched in by a corrosive jet, the duration of the effect of which is varied as it is guided over the surface of the semiconductor member according to the etching effect which it is desired to produce. Reference is also made to the formation of a bevelled cavity in an article by Günterhöhl: "Quantitative design of high-cutoff thyristors," ETZ-A, Vol. 89, 1968, No. 6, p. 131 et seq.

However, great technological difficulties are encountered in etching a bevelled cavity into a semiconductor pellet 350–450 μ-thick, since the various highly doped zones are dissolved to a different extent by an etching solution. A further important point is that the external surface must be geometrically homogeneous. Zones of damage such as crystal destruction and microfissures can easily occur in the course of the foregoing steps of mechanical processing. The etching liquid penetrates to a greater extent into these fissures, and merely enlarges the inhomogeneities. However, these inhomogeneities determine the maximum inverse voltage which may be applied. Etching is successfully used for a simple surface profile, for example, mesa techniques. However, almost insuperable obstacles are encountered in etching in an accurately defined bevelled cavity.

The invention is therefore based on the problem of developing a process which enables any desired external surface profiles to be produced.

The invention resides in that the bevelled cavity is ground in by wires in a successive grinding operation starting with a wire of a certain diameter and thereafter utilizing grinding wires which are of progressively smaller diameter. The decisive and fundamental advantage of the invention is the increase in emitter surface. Since the bevelled cavity need not be ground in very deeply, its minimum internal diameter is greater than the diameter of the plane emitter surface of a normal semiconductor pellet comprising the mesa technique for a given external diameter. In the first place, hollow ground semiconductor elements can, as a result, carry more current and larger current bursts, and in the second place the plane emitter surface available for contact purposes is very much greater, which has the consequence of better heat dissipation. A further advantage of the semiconductor element according to the invention is that, if the two P-zones are symmetrically doped, the inverse voltage in the cutoff direction is the same as the inverse voltage in the conductive direction. Grinding agents with varying granulation may also be used in order to facilitate formation of the desired bevelled cavity.

Figure 2:
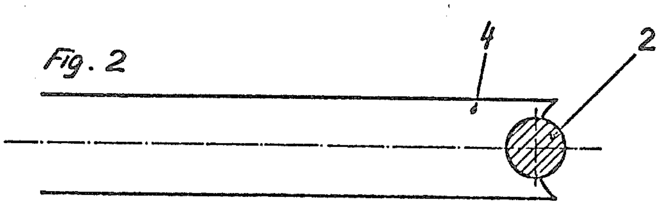
Figure 3:
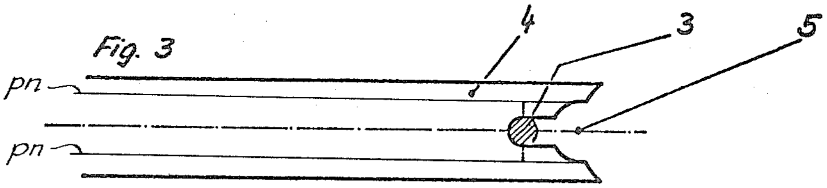

One suitable embodiment of the invention is illustrated in the accompanying drawings in which FIGS. 1 to 3 are sequential views showing three separate grinding steps utilizing three different grinding wires which have progressively smaller diameters for forming the cavity in the edge of the semiconductor disc.

A production process, for forming the bevelled cavity in three steps is illustrated in FIGS. 1 to 3. The bevelled cavity 5 as seen in FIG. 3 is ground into the edge of the round semiconductor disc 4 in successive stages with grinding wires 1, 2, 3 of progressively decreasing diameter, the desired profile being thus substantially imparted to the bevelled cavity. As is evident from FIG. 1 the grinding is initiated by use of a grinding wire 1 having a diameter greater than the thickness of the semiconductor disc 4 and this is then replaced with a second wire 2 of a diameter smaller than the disc thickness, and then by a third wire 3 of even smaller diameter to make the final cut into the edge of the disc.

We claim:

1. PN-junction method for the production of a bevelled cavity having a positive bevel in the noncontacted edge surface of a disc of semiconductor material having at least two PN-junctions reaching to the edge of the disc which comprises the steps of grinding out said bevelled cavity in a plurality of successive grinding operations by means of grinding wires which progressively decrease in diameter.

2. The method of producing a bevelled cavity in the noncontacted edge surface of a disc of semiconductor material as defined in claim 1 wherein the wire grinding is initiated with a wire whose diameter is greater than the thickness of the semiconductor disc, and is then continued with other grinding wires whose diameters are less than the thickness of the disc.

3. The method of producing a bevelled cavity in the noncontacted edge surface of a disc of semiconductor material as defined in claim 8 and wherein grinding agents of varying granulation are also utilized in conjunction with the wire grinding.

PO-1050
(5/69)

UNITED STATES PATENT OFFICE
CERTIFICATE OF CORRECTION

Patent No. 3,628,294 Dated December 21, 1971

Inventor(s) Gunter Sattler and Klaus Weimann

It is certified that error appears in the above-identified patent and that said Letters Patent are hereby corrected as shown below:

Claim 1, line 1 - cancel "PN-junction" and substitute -- A --

Claim 3, line 3 - cancel "claim 8" and substitute --claim 1 --

Signed and sealed this 2nd day of May 1972.

(SEAL)
Attest:

EDWARD M.FLETCHER,JR.
Attesting Officer

ROBERT GOTTSCHALK
Commissioner of Patents